A. N. HILL.
MEASURING INSTRUMENT.
APPLICATION FILED DEC. 24, 1918.

1,328,876.

Patented Jan. 27, 1920.

Inventor
A. N. Hill
by
His Atty

UNITED STATES PATENT OFFICE.

ALFRED NILSSON HILL, OF LUND, SWEDEN.

MEASURING INSTRUMENT.

1,328,876.  Specification of Letters Patent.  Patented Jan. 27, 1920.

Application filed December 24, 1918. Serial No. 268,131.

*To all whom it may concern:*

Be it known that I, ALFRED NILSSON HILL, a citizen of Sweden, residing at Lund, Sweden, have invented certain new and useful Improvements in Measuring Instruments, of which the following is a specification.

This invention relates to a measuring instrument provided with membranes for transmitting the rectilinear motion of the membranes into a rotating motion of an indicator.

In order to obtain a transmission of this kind it has been proposed to use a screw or the like connected with the indicator, said screw causing a rotating movement of the indicator by means of a nut connected with the membrane. For the purpose of avoiding too great a frictional resistance a certain distance must be provided between the nut and the screw, and in this way the accuracy of the instrument will be lost. According to the present invention a hollow cylinder connected with the indicator and provided with two diametrically opposed helical slots is used for transmitting the movement, and a pin connected with the membrane and fitting in the slots is put through said slots. At the movement of the membranes the pin causes the cylinder and the indicator to rotate. On account of the cylinder being provided with two slots the pin will be guided in all directions and prevented from vibrating, and thus an instrument is obtained that meets all requirements.

Figure 1:
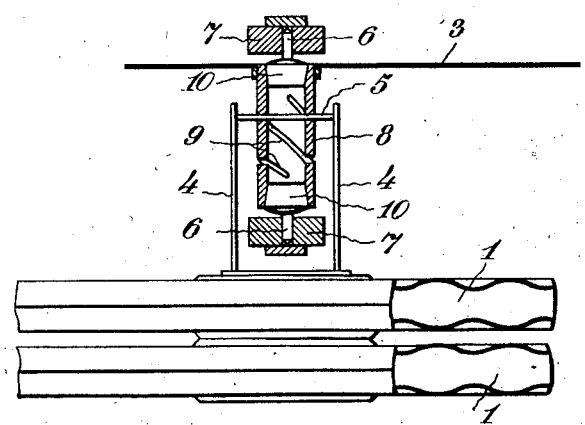
Figure 2:
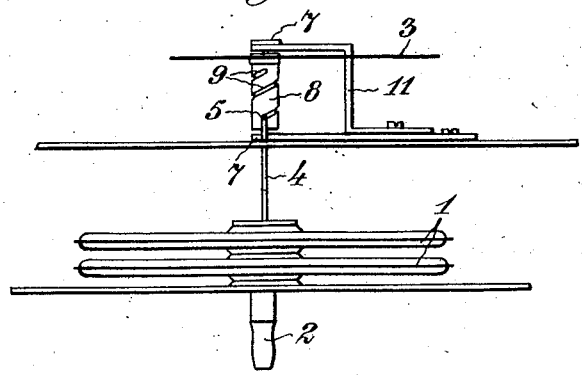
Figure 3:
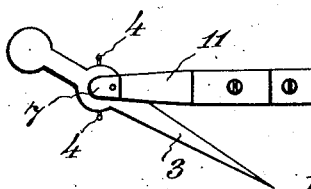

The invention is illustrated on the accompanying drawing. Figure 1 is a vertical section through the instrument. Fig. 2 is a side view of the same on a smaller scale, and Fig. 3 is a plan view of Fig. 2.

The membranes, which may be given any suitable form, consist in the form shown of two bellows shaped members 1 communicating with each other. The closed interior of said members is connected with a pipe 2 through which a pressure above atmospheric or a vacuum may be produced in the membranes in such a way that they expand or contract and perform a rectilinear movement which is to be transferred into a rotating movement of the indicator 3, in order to make a reading or automatic registration possible.

Two upright or supports 4 are provided on the membrane nearest to the indicator. These supports are connected with each other at their upper free ends by means of a cross-piece or a pin 5. The indicator 3 is connected with a hollow cylinder 8 that is mounted in fixed bearings 7 by means of the journals 6 and provided with two helical, parallel slots 9 diametrically opposed to each other. The pin 5 is put through these slots. As the cylinder is hollow the journals 6 are connected with plugs 10 inserted in the ends of the cylinder.

When the membranes expand the supports 4 and the pin 5 are moved upward in relation to the cylinder, and thus the latter is turned and carries the indicator with it in one direction. When the membranes contract the indicator will rotate in an opposite direction. The movement of the indicator can be read off in both cases on a scale arranged in a suitable place under the indicator. When the bearings 7, as shown, are fastened to a common bridge 11 the indicator can easily be adjusted by moving the bridge in such a way that the position of the indicator coincides with zero when the instrument is out of service.

What I claim is:—

1. A measuring instrument comprising a diaphragm, standards extending from the diaphragm, a rod connecting the standards, top and bottom bearings, a cylinder mounted in the bearings, said cylinder having two corresponding spiral slots through which the rod extends, and a pointer carried by the cylinder, whereby when the diaphragm pulsates the pointer will be circumferentially moved.

2. A measuring instrument comprising a diaphragm, standards extending from the diaphragm, upper and lower bearings supported above the diaphragm, a cylinder mounted in the bearings, said cylinder having oppositely disposed corresponding spiral slots, means extending from the standards to engage the slots and a pointer on the cylinder whereby when the diaphragm is pulsated the pointer will be turned.

In testimony whereof, I have signed my name to this specification in the presence of two subscribing witnesses.

ALFRED NILSSON HILL.

Witnesses:
A. W. ANDERSON,
FRED FLERON.